United States Patent [19]

Bradshaw et al.

[11] Patent Number: 4,952,023
[45] Date of Patent: Aug. 28, 1990

[54] INTERNALLY ILLUMINATED RETROREFLECTIVE SIGN

[75] Inventors: Thomas I. Bradshaw, Afton; Edward S. Shinbach, St. Paul, both of Minn.

[73] Assignee: Minnesota Mining and Manufacturing Company, St. Paul, Minn.

[21] Appl. No.: 165,881

[22] Filed: Mar. 18, 1988

[51] Int. Cl.[5] .............................................. G02B 5/122
[52] U.S. Cl. .................................... 350/102; 350/105; 40/564; 362/29
[58] Field of Search ................. 350/97, 101, 102, 103, 350/105, 96.28; 40/205, 208, 564; 404/9, 10; 362/29, 30, 341

[56] References Cited

U.S. PATENT DOCUMENTS

| | | | |
|---|---|---|---|
| 3,005,382 | 10/1961 | Weber | 350/105 |
| 3,924,929 | 12/1975 | Holmen et al. | 350/103 |
| 4,005,538 | 2/1977 | Tung | 40/564 |
| 4,025,159 | 5/1977 | McGrath | 350/105 |
| 4,208,090 | 6/1980 | Heenan | 350/590 |
| 4,260,220 | 4/1981 | Whitehead | 350/96.28 |
| 4,349,598 | 9/1982 | White | 428/161 |
| 4,588,258 | 5/1986 | Hoopman | 350/103 |
| 4,615,579 | 10/1986 | Whitehead | 350/96.1 |
| 4,672,089 | 6/1987 | Pricone et al. | 524/354 |
| 4,775,219 | 10/1988 | Appeldorn et al. | 350/103 |

OTHER PUBLICATIONS

"Transflectors Take Off at U.S. Airports," Reflexite Corporation Newsletter, Spring 1988.

*Primary Examiner*—Bruce Y. Arnold
*Assistant Examiner*—Loha Ben
*Attorney, Agent, or Firm*—Donald M. Sell; Walter N. Kirn; Peter Forrest

[57] ABSTRACT

An internally illuminated sign employs retroreflective sheeting with optically transmissive bonds between cover layer and base layer, thereby making the sign suitable for applications where visibility of the sign is required if the internal illumination source fails. A light conduit may be employed to allow the source of internal illumination to be remote from the interior of the sign enclosure. Total internal reflection type sheeting also may be employed to diffuse the internal illumination.

19 Claims, 3 Drawing Sheets

INTERNALLY ILLUMINATED RETROREFLECTIVE SIGN

TECHNICAL FIELD

This invention relates to internally illuminated signs which employ retroreflective materials. Light may be introduced into the interior of the sign by a light conduit.

BACKGROUND

Internally illuminated signs present an image to the viewer which generally is more easily observed at night than non-illuminated or externally illuminated signs. Internally illuminated signs are commonly used in outdoor advertising. As the primary function of traffic signs is to present important information to automobile drivers efficiently, internally illuminated signs are also useful in this application.

However, internally illuminated signs are not suitable for night use where electricity is not readily available (such as traffic signs for remote rural roads), or in any location where loss of power is possible (i.e., if the sign is connected to an interruptable circuit without a backup power source). Another problem is that the light sources (typically incandescent or fluorescent bulbs) require periodic replacement due to their limited life. Retroreflective materials have been used to augment internally illuminated signs so they will be visible when illuminated by a vehicle headlight. In this way, the sign is visible even if the power or light source is not operative.

One type of retroreflective material generally comprises microspheres with a specular reflecting layer added to reflect the incident light within a narrow angular range about the incident light direction. An embodiment of this approach embeds the microspheres in strands of a web. The application of this to an internally illuminated sign utilizes the open areas of the web for transmission of the internal illumination to the viewer of the sign, while the retroreflective microspheres allow the sign to be viewed at night under vehicle headlights.

Another type of retroreflective material comprises cube corner elements. As taught by U.S. Pat. No. 4,588,258 (Hoopman), such sheeting may be made to transmit internal illumination by separating cube corner elements, producing flat interstitial areas which transmit light from inside the sign to the outside.

DISCLOSURE OF INVENTION

The invention is an internally illuminated sign comprising an enclosure transmissive to light on at least one side, designated the front side, and cube corner retroreflective sheeting positioned to reflect light incident on the front of the sign, wherein the cube corner retroreflective sheeting: (1) comprises a cover layer having a multiplicity of retroreflective cube corner elements and a base layer of transparent material bonded to the cover layer, and (2) has areas, where the base layer has been bonded to the cover layer, which are (a) optically transmissive to internal light with an angle of incidence greater than or equal to zero degrees and less than 90 degrees, and (b) interspersed among the areas occupied by cube corner elements, the ratio of such transmissive and cube corner areas and their arrangement relative to each other being fixed to allow viewing the sign by means of either internal illumination, retroreflected light, or both.

The enclosure can be assembled from any suitable materials known in the art. Generally, it produces an interior space from which the internal illumination passes to the observer only through the light transmissive side or sides. The source of internal illumination may be within the sign or outside of it; in the latter case, the illumination is introduced into the interior by a light conduit. One may use a diffusing surface between the illumination source and the front side. A graphic, if used, is located on the front side of the sign, and is assembled using suitable materials known in the art. A "graphic" is a textual or symbolic display of information, such as a traffic symbol.

DESCRIPTION OF THE INVENTION

Figure 1:
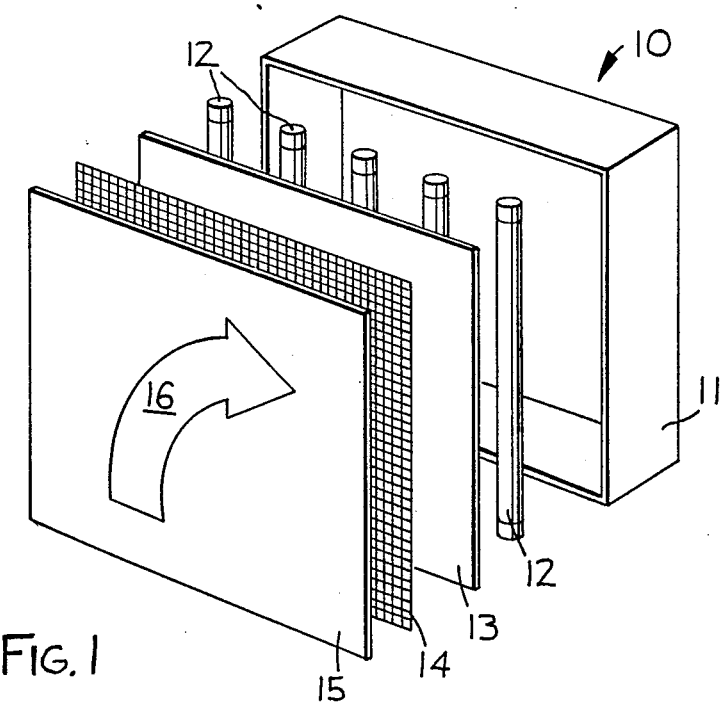
FIG. 1 is an exploded schematic view of a sign of this invention.

FIG. 1 shows a schematic view of a sign 10 of this invention, comprising an enclosure 11, a source of internal illumination (in this embodiment a set of tubular light bulbs) 12, a diffuser 13, retroreflective sheeting 14, and a transparent sign face 15. In this embodiment, the transparent sign face is carrying a graphic 16 visible from the front side of the sign by means of either internal illumination, retroreflected light, or both.

The sign may have one or more internal light sources 12, or the source of internal illumination may be external to the enclosure, with the light introduced into the interior of the enclosure through one or more entrances by a light conduit. Light conduits, also known as light guides or light pipes, transmit light from an illumination source along the longitudinal axis of the conduit without an extensive decrease in the intensity of light leaving the conduit at the end opposite the illumination source.

The diffuser 13 is not necessary but is preferred so that light traveling through the sign face 15 is substantially uniform over the whole area of the front side or graphic 16.

The graphic 16 may be positioned on the face of the sign using means presently known in the art. For example, the graphic may comprise regions of a thin layer of colored, light-transmissive ink bonded to a transparent plate at the exterior face of the sign, between the retroreflective material and the viewer. White light passing through the ink from behind the graphic either directly from the interior of the sign, or after retroreflection, will present a colored image to the viewer. It is also possible to bond the light-transmissive ink directly to the retroreflective sheeting 14, eliminating the sign face 15.

Retroreflective sheeting incorporating cube corner elements is preferred. One especially preferred design of cube corner retroreflective elements is described in U.S. Pat. No. 4,588,258 (Hoopman). Such an article comprises at least one matched pair of cube corner retroreflective elements, the three mutually perpendicular lateral faces of the elements being formed by three sets of intersecting continuous grooves having a common depth and a V-shaped cross section so that the base edges of the lateral faces of the elements lie in a common plane established by the bottom of the grooves (see column 4, lines 15-50 and FIGS. 1"3 of U.S. Pat. No. 4,588,258). The cube corners are assembled into sheeting using the techniques taught in U.S. Pat. No. 4,588,258 to provide sufficient retroreflective intensity in planes in which observers of the sign will be located. For example, in a traffic application, the angle at which the optical axes of the elements point can be adjusted (for a given index of refraction of the material) to improve visibility for observers on the roadway, but not for observers on the side of the road.

The article disclosed in U.S. Pat. No. 4,588,258 is made partially transparent by separating the cube corner elements, creating flat areas of the article through which the internal illumination passes (see column 6, line 50 to column 7, line 21 of U.S. Pat. No. 4,588,258). Because the areas of separation are flat, light rays from the interior of the sign will pass through such areas regardless of their angle of incidence.

Figure 2:
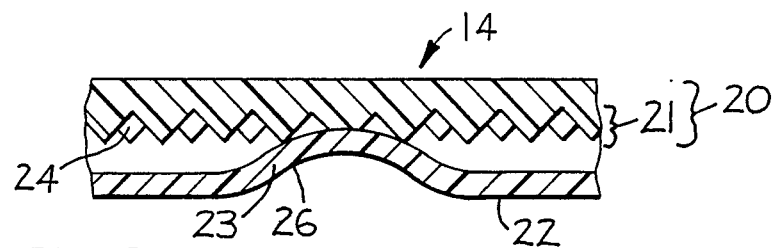
FIG. 2 is an enlarged cross-sectional view of the retroreflective sheeting 14 of FIG. 1, taken along the line 2—2 of FIG. 3.

In the present invention, as shown in FIG. 2, the sheeting 14 comprises a cover layer 20 having a multiplicity of retroreflective cube corner elements 21, the cover layer being bonded to a transparent base layer 22 with one or more bonds 23. Cube corner elements 24 which are not within the area of the bonds 23 are not affected (ignoring any effects due to the isolation of the elements 24 from the exterior of the sheeting 14). The sheeting is designed so that the cover layer 20 is toward the front of the sign and the base layer 22 is toward the interior of the sign.

It is necessary to employ transparent bonds 23, so that internal illumination of any incidence angle may leave the interior of the sign through the bonds and illuminate the graphic 16. This allows the graphic to be viewed by means of either internal illumination, retroreflected light, or both. In the embodiment of FIG. 2 the bond material is the same as the base layer material. Where the bond material meets the cover layer, portions of the cube corner elements remain (although typically distorted) after bonding. Thus, in this embodiment, transparent bonds are produced when the base layer 22 and the cover layer 20 are transparent, and the indices of refraction thereof are nearly the same. A material is "transparent" for the purposes of this discussion when it transmits more than about 70 percent of the intensity of an incident light beam. A typical index of refraction value for either layer would be between about 1.3 to 1.7, which includes the indices of refraction of plastic acrylics and polycarbonates which have been used for cover layers.

Thus, those areas where the base layer has been bonded to the cover layer are optically transmissive to light rays leaving the interior of the sign. Such rays pass through the area of the bonds 23 for any angle of incidence less than 90° but greater than or equal to 0°. The angle of incidence is defined as the angle between a light ray striking a point on the base layer 22 and the normal to the surface of the base layer at that point.

The bonding of the cover and base layers may be through any suitable means known in the art, such as those taught in U.S. Pat. Nos. 3,190,178 (McKenzie) or 4,025,159 (McGrath). Such methods include thermal bonding under pressure with a heated embossing tool, and techniques using adhesive layers between the cover layer and base layer. Suitable adhesives may be heat-activated, solvent-activated, or pressure sensitive. Subsequent in situ curing initiated by radiation or particle beam may also be employed. Whatever adhesion method is chosen, it should produce a bond between the cover layer and base layer which is transparent. The bonding method may influence the range of angles of incidence for which the bonds are transparent to internal illumination. For example, for the embossed sheeting shown in FIG. 2, light rays with angles of incidence approaching 90° may strike the base layer on the curved portion 26. Such a ray may not fully traverse the bond 23 and cover layer 20.

The index of refraction of the cube corner material is one factor determining the retroreflective intensity at a given incidence angle. In general, for a given optical design, the higher the index of refraction, the greater the angularity of retroreflected light. "Angularity" is the ability of a material to retroreflect light brightly within a desired angular range. A material with a large retroreflective angularity will brightly retroreflect light that impinges on it within a broad angular range about the line normal to the material. For this reason, high index of refraction materials have been preferred for cube corner articles because improved retroreflective performance was emphasized. For a sign of the present invention, internal illumination intensity will increase (and retroreflective intensity will therefore decrease due to the fewer number of cube corner elements remaining), if the area of the bonds is increased. The use of relatively low index of refraction materials is possible for cover layer 20, because the additional loss of retroreflective intensity can be moderated by adjusting the area of the bonds 23.

Figure 3:
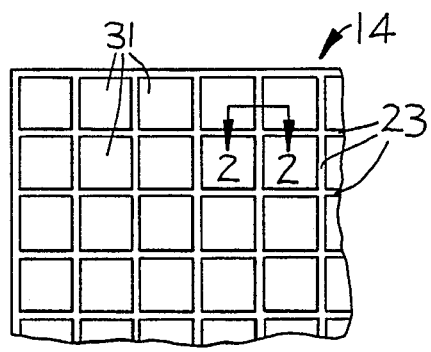
FIG. 3 is a front view of the retroreflective sheeting 14 of FIGS. 1 and 2.

Uniform illumination of the graphic against the background to improve the legibility of the graphic is preferred. With the retroreflective sheeting of this invention, one means of controlling the contrast of the graphic against the background is to assemble the sheeting such that the bonds produce a regular arrangement of hermetically sealed retroreflective cells. The regularity of the pattern of transparent bond areas helps produce even illumination of the graphic by the internal illumination source For example, FIG. 3 shows a rectangular array of bonds 23, which forms a regular arrangement of retroreflective cells 31 of cube corner elements.

Figure 4:
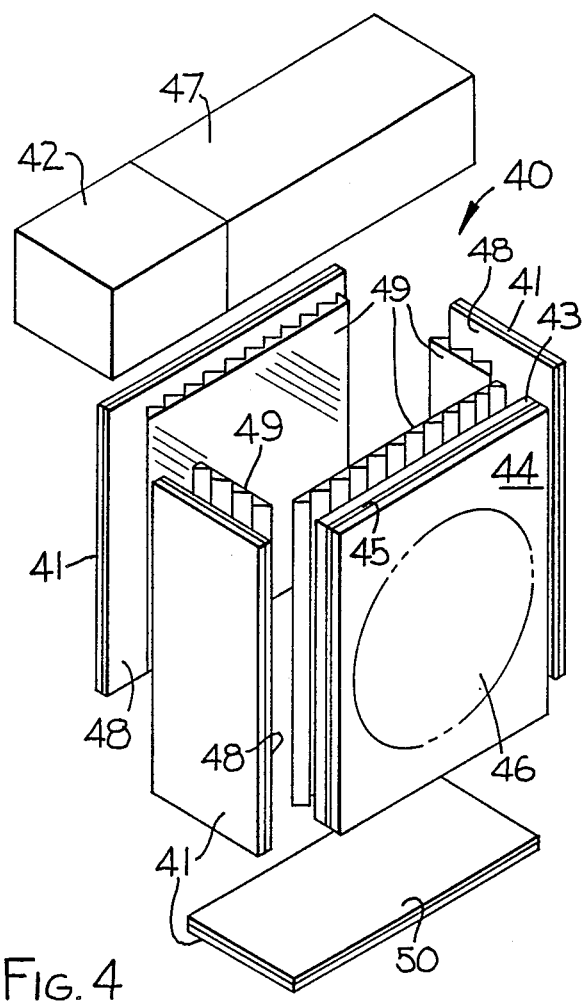
FIG. 4 is an exploded schematic view of an embodiment of this invention designed for use as a traffic sign, where the source of retroreflected light is vehicle headlights.

FIG. 4 shows a preferred embodiment of the invention designed for use as a traffic sign, where the source of retroreflected light is automobile headlights. This sign, generally identified as 40, comprises enclosure members 41, a light source 42, a graphic 46, and a light conduit 47. Other components of the sign are diffuser 43, retroreflective sheeting 44, diffuse reflectors 48, internal reflectors 49, and specular reflector 50.

The light source 42 is external to the interior of the sign to decrease the maintenance effort required, e.g., a light bulb may be changed without removing the entire face or back of the sign. The light from the source is introduced into the interior of the sign by the light conduit 47. The preferred light conduit shown comprises a longitudinal hollow structure made of transparent dielectric material. The hollow structure is formed of one or more longitudinal sections with planar surfaces. The inner and outer planar surfaces meet all three of the following conditions: (1) all of the inner surfaces of a section in the hollow air space are either perpendicular or parallel to one another; (2) the outer surfaces of a section are either perpendicular or parallel to one another; and (3) the inner surfaces are at a 45° angle to the outer surfaces. As defined in U.S. Pat. No. 4,260,220 (Whitehead), the term "in octature" signifies that all three conditions are met for each section. The cross section of the conduit should be constant along the longitudinal axis, and generally the surfaces should be flat and smooth.

The angular distribution of the light leaving the conduit may be controlled to provide, for example, greater uniformity of intensity within the enclosure 41. This may allow for greater flexibility in the selection of diffuser 43 or internal reflectors 49. For the preferred light conduit described above, the angular distribution may be controlled by making at least a portion of one outer surface non-planar, or by making an outer surface rough, or by providing round corners in a corrugated outer surface. Additionally, objects such as diffusion screens or specular reflectors may be placed within the conduit to change the angular distribution of escaping light.

The internal reflectors 49 can be ordinary specular reflectors such as smooth brushed aluminum, but are preferably comprised of a totally internally reflective material. This material may also be the material preferred for the light conduit described above, but need not be. It is useful to add diffuse reflectors 48 on the exterior of the internal reflectors 49 on all sides but the front (graphic-carrying) and top (light conduit) sides of the enclosure. At the interior of the bottom of the enclosure is specular reflector 50.

The graphic 46 is printed directly upon the front surface of the retroreflective sheeting 44, and the latter is adhered to the diffuser 43 with transparent adhesive 45.

EXAMPLE 1

A sign was constructed according to FIG. 1. The enclosure was of conventional sheet metal and angle iron, and the illumination source was a series of fluorescent tubes. A conventional diffuser was included but a graphic was not placed on the front of the sign. The front side of the sign was designed to allow direct comparison of the transmission of internal illumination of cube corner retroreflective sheeting of the present invention against the sheeting of U.S. Pat. No. 4,588,258 (Hoopman). Three sheeting samples were made using cube corner elements as taught in U.S. Pat. No. 4,588,258 (Hoopman). One sheeting (denoted "sheeting A") was that of the present invention, incorporating a base layer and optically transmissive bonds. A second sheeting ("sheeting B") was made with separated cube corner elements, as taught at column 7, lines 5-21, of U.S. Pat. No. 4,588,258 (Hoopman), with no base layer and bonds. The third sheeting ("sheeting C") comprised neither separated cube corner elements or a base layer and bonds. Each sheeting was 0.6 meter square. Because the cube corner elements used were known to have preferred directions in their optical properties (see column 5, line 18 to column 6, line 22 of U.S. Pat. No. 4,588,258), the sign was assembled so that the preferred directions of each sheeting were the same.

For the inventive sheeting A, the polycarbonate (refractive index 1.59) cover layer was bonded to the polyester base layer (refractive index 1.58) by thermal embossing. The bond pattern was a regular arrangement of hexagons. The area of the bonds was approximately 20% of the total area of sheeting A. Net transparency of the bonds was approximately 88%.

Photometric measurements of the retroreflectance in units of candela/lux/square-meter $Cd/Lx/m^2$) were made at angles corresponding to the angles at which the "Field" measurements (described below) were to be made. These measurements were used to calculate curves of retroreflective luminance ($Cd/m^2$) versus distance. These curves confirmed that sheetings A and B were approximately equivalent in this respect, and that the retroreflective luminance of sheeting C was slightly greater.

For each sheeting, photometric measurements of the luminance of the internal illumination transmitted through the front face of the sign were made in a darkened room with no external illumination source, i.e., there was no retroreflected component to the measured illumination. Measurements were made at angles corresponding to the angles at which the field measurements (described below) were to be made. At each angle the luminance with and without the sheeting was made, and the ratio of the two (expressed as a percentage) determined the amount of internal illumination transmitted through the sheeting.

Figure 5:
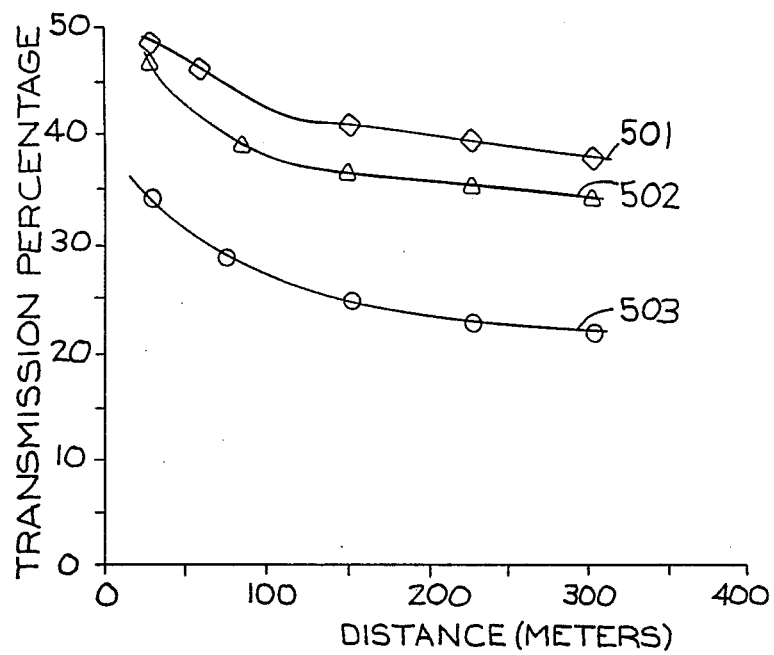
FIG. 5 is a graph comparing the percentage of internal illumination transmitted by three retroreflective sheetings.

The measurements are graphed in FIG. 5. Lines 501 and 502, representing sheetings A and B, respectively, show a greater amount of transmitted internal illumination than line 503, representing sheeting C. This shows that both the optically transmissive bonds of sheeting A and the separation of cube corner elements of sheeting B allow more light to pass through the sheeting than no transmission means at all (sheeting C).

The sign was then employed in a field simulation of a typical traffic sign application. The center of the sign was placed approximately 6.4 meters above a roadway. The sign was tilted from the vertical plane (perpendicular to the roadway) by 7.5 degrees, so that the front face of the sign faced the sky slightly, as is common in the art. For each sheeting, measurements of the luminance of the internal illumination leaving the sign through the face were made from a vehicle in the lane of roadway passing directly underneath the sign, at a variety of distances from the sign, and with no source of external illumination.

Figure 6:
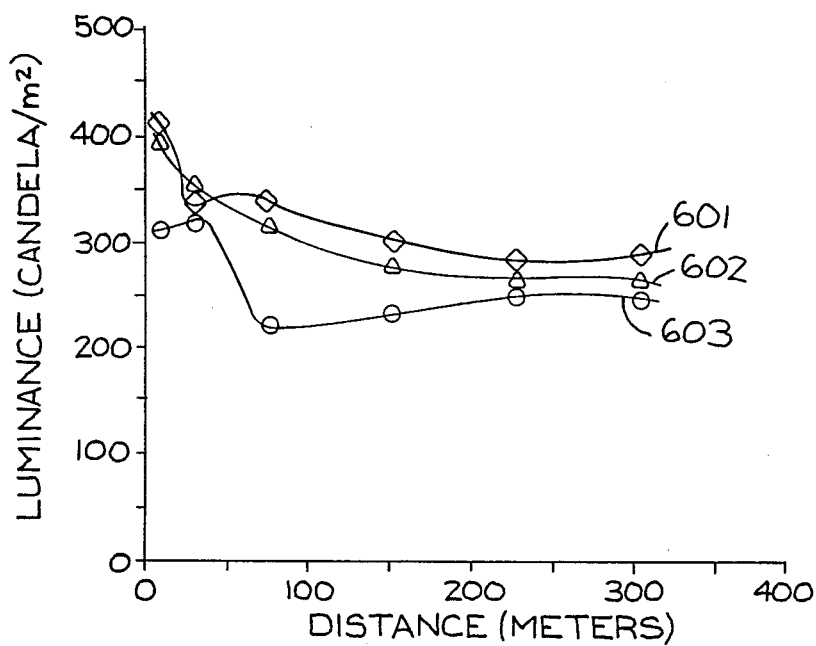
FIG. 6 is a graph comparing field measurements of the luminance of internal illumination transmitted by the three retroreflective sheetings of FIG. 5.

The measurements are graphed in FIG. 6. Lines 601 and 602 represent sheetings A and B, respectively, and show a greater amount of transmitted internal illumination than line 603, representing sheeting C. This confirms that both the optically transmissive bonds of sheeting A and the separation of cube corner elements of sheeting B allow more light to pass through the sheeting than no transmission means at all (sheeting C). Comparison of lines 601 and 602 to lines 501 and 502 suggests that the performances of sheetings A and B are more similar to each other in the field measurements than in the indoor measurements.

While certain representative embodiments and details have been shown to illustrate this invention, it will be apparent to those skilled in this art that various changes and modifications may be made in this invention without departing from its true spirit or scope, which is indicated by the following claims.

We claim:

1. An internally illuminated sign comprising an enclosure transmissive to light on at least one side, designated the front side, and cube corner retroreflective sheeting positioned to reflect light incident on the front of the sign, wherein the cube corner retroreflective sheeting:
   (1) comprises a cover layer having a multiplicity of retroreflective cube corner elements and a base layer of transparent material partially bonded to the cover layer, and
   (2) has areas, where the base layer has been bonded to the cover layer, which are:
      (a) optically transparent to internal light with an angle of incidence greater than or equal to zero degrees and less than 90 degrees,
      (b) interspersed among the areas occupied by cube corner elements, the proportion of such transparent areas to the total sheeting area and their arrangement relative to each other being fixed to allow viewing the sign by means of either internal illumination, retroreflected light, or both.

2. The sign of claim 1, wherein the internal illumination is directed to the interior of the enclosure by a light conduit comprised of internally reflective material.

3. The sign of claim 2, wherein the light conduit comprises a means for controlling the release of light into the interior of the enclosure, and inner and outer surfaces which are in octature.

4. The sign of claim 1, further comprising means for diffusing light traveling through the front side.

5. The sign of claim 4, wherein the means for diffusing light comprises internally reflective material with inner and outer surfaces which are in octature.

6. The sign of claim 1, wherein the base layer is bonded to the cover layer of cube corner retroreflective sheeting material to form a regular arrangement of hermetically sealed retroreflective cells.

7. The sign of claim 1, wherein the index of refraction of the cover layer is between 1.3 and 1.7.

8. The sign of claim 7, wherein the index of refraction of the base layer is between 1.3 and 1.7.

9. The sign of claim 8, wherein the index of refraction of the areas where the base layer has been bonded to the cover layer is between 1.3 and 1.7.

10. The sign of claim 1, wherein the sign further comprises a graphic visible from the front side by means of either internal illumination, retroreflected light, or both.

11. The sign of claim 1, wherein the total area where the base layer has been bonded to the cover layer is more than zero yet less than seventy-five percent of the total area of the retroreflective sheeting.

12. The sign of claim 11, wherein the total area where the base layer has been bonded to the cover layer is more than ten yet less than thirty percent of the total area of the retroreflective sheeting.

13. A cube corner retroreflective sheeting comprising a cover layer having a multiplicity of retroreflective cube corner elements and a base layer of transparent material partially bonded to the cover layer, wherein the areas where the base layer has been bonded to the cover layer are optically transparent, the proportion of such transparent areas to the total sheeting area, and their arrangement, being fixed to allow viewing a graphic of an internally illuminated sign comprising the sheeting by means of either internal illumination, retroreflected light, or both.

14. The sheeting of claim 13, wherein the base layer is bonded to the cover layer of cube corner retroreflective sheeting material to form a regular arrangement of hermetically sealed retroreflective cells.

15. The sheeting of claim 13, wherein the index of refraction of the cover layer is between 1.3 and 1.7.

16. The sheeting of claim 15, wherein the index of refraction of the base layer is between 1.3 and 1.7.

17. The sheeting of claim 16, wherein the index of refraction of the areas where the base layer has been bonded to the cover layer is between 1.3 and 1.7.

18. The sheeting of claim 13, wherein the total area where the base layer has been bonded to the cover layer is more than zero yet less than seventy-five percent of the total area of the retroreflective sheeting.

19. The sheeting of claim 18, wherein the total area where the base layer has been bonded to the cover layer is more than ten yet less than thirty percent of the total area of the retroreflective sheeting.

* * * * *